Patented Apr. 18, 1933

1,903,895

UNITED STATES PATENT OFFICE

HEINRICH GÜNZLER AND OSKAR NEUBERT, OF ELBERFELD NEAR COLOGNE, GERMANY, ASSIGNORS TO WINTHROP CHEMICAL COMPANY, INC., OF NEW YORK, N. Y.

NEW COLLOIDAL MERCURIZED AROMATIC HYDROXY COMPOUNDS

No Drawing. Application filed November 17, 1925, Serial No. 69,701, and in Germany November 21, 1924.

The organic mercury compounds which are so extremely important for medicinal purposes and for disinfection are for the greater part completely insoluble in water or soluble with difficulty. For the above purposes however aqueous solution are of the greatest interest.

The present process relates to a simple method of converting the mercury compounds in question into an easily water-soluble form. This conversion is effected by dissolving the organic mercury compounds particularly a mercurized phenol in acids or alkalies, adding an organic protective colloid as such or in the form of an aqueous solution, then carefully neutralizing, if desired, and precipitating by means of an inert organic non-solvent which is miscible with water. After the drying of the precipitate, a powder is obtained which is stable in the air and which is easily soluble in water. The protective colloid may also be added in the manufacture of the mercury compound itself, thus obviating the isolation of the same. After the combination of the mercury with the organic residue has been effected in the colloidal solution, the further working up of the compound may be carried out as above described.

The new colloidal compounds are intended to be used as disinfectants, in medicine and as plant protecting media, for example, for immunizing grain. For the latter purpose they are particularly suitable owing to their great wetting properties.

They are greyish to yellow amorphous powders which are distinguished from the mercury compounds used as starting materials in that they are soluble in water without the aid of alkaline compounds.

The following examples serve to illustrate our invention, it being understood, that the proportions and conditions of working may be varied within wide limits.

Example I 10 parts by weight of the mercury compound of orthonitrophenol having most probably the formula:

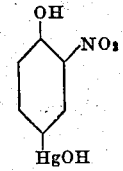

are dissolved in 100 parts by weight of water and 2 parts by weight of sodium hydroxide and added while stirring to a solution of 100 parts by weight of albumose in 800 parts of water. The alkaline solution is neutralized by means of dilute acetic acid and precipitated with acetone. The solution is allowed to stand and in order to remove the last traces of water the residue is advantageously again digested with acetone and after filtration dried in the air or at about 60° C. A sandy yellow powder is thus obtained containing 15.5 per cent of mercury; the product is easily soluble in water with a neutral reaction.

Example II 34 parts by weight of mercury acetate are dissolved in water and treated with 100 parts by weight of dextrin in the form of an aqueous solution of 40% strength. 20 parts by weight of phenol, previously rendered liquid by the addition of 5 parts of water are then added. After several hours the reaction of the mercury with the phenol is complete, which is ascertained by testing whether a portion of the reaction mixture yields any longer a precipitation of mercury oxide by the addition of sodium hydroxide. The solution is then precipitated with concentrated alcohol and the precipitate further treated and isolated as described in Example I. A powder is thus obtained, containing about 10 per cent of mercury; it is easily soluble in water with a neutral reaction.

The product obtained from mercurized orthochlorphenol contains about 13 per cent mercury.

We claim:

1. As new products colloidal mercurized nitro-phenol compound preparations being in their dry solid form grayish to yellow powders readily soluble in water and having valuable insecticidal properties.

2. Process for the production of readily soluble colloidal mercurized phenol compounds which comprises dissolving a mercurized phenol compound in alkali, adding an organic protective colloid, neutralizing the mixture and precipitating a colloidal mercurized phenol compound by means of inert organic non-solvent miscible with water.

3. Process for the production of readily soluble colloidal mercurized phenol compounds which comprises dissolving a mercurized phenol compound in alkali, adding an aqueous solution of an organic protective colloid, neutralizing the mixture and precipitating a colloidal mercurized phenol compound by means of inert organic non-solvent miscible with water.

4. Process for the production of readily soluble colloidal mercurized phenol compounds which comprises dissolving a mercurized phenol compound in sodium hydroxide, adding an aqueous solution of an organic protective colloid, neutralizing the mixture and precipitating a colloidal mercurized phenol compound by means of an inert organic non-solvent miscible with water.

5. Process for the production of readily soluble colloidal mercurized nitrophenol compounds which comprises dissolving a mercurized nitrophenol compound in sodium hydroxide, adding an aqueous solution of an organic protective colloid, neutralizing the mixture and precipitating a colloidal mercurized nitrophenol compound by means of an inert organic non-solvent miscible with water.

6. As new products, colloidal preparations of a mercurized phenol, being in their dry solid form grayish to yellow powders, readily soluble in water and having insecticidal properties.

7. As new products, colloidal preparations of mercurized phenol, being in their dry solid form grayish to yellow powders, readily soluble in water and having insecticidal properties.

In testimony whereof we have hereunto set our hands.

HEINRICH GÜNZLER.
OSKAR NEUBERT.